(12) United States Patent
Seok

(10) Patent No.: US 8,072,895 B2
(45) Date of Patent: Dec. 6, 2011

(54) MANAGEMENT PROCEDURE IN WIRELESS COMMUNICATION SYSTEM AND STATION SUPPORTING MANAGEMENT PROCEDURE

(75) Inventor: Yong Ho Seok, Seoul (KR)

(73) Assignee: LG Electronics Inc., Seoul (KR)

( * ) Notice: Subject to any disclaimer, the term of this patent is extended or adjusted under 35 U.S.C. 154(b) by 880 days.

(21) Appl. No.: 12/118,605

(22) Filed: May 9, 2008

(65) Prior Publication Data

US 2008/0291883 A1    Nov. 27, 2008

(30) Foreign Application Priority Data

May 25, 2007    (KR) .................... 10-2007-0050730

(51) Int. Cl.
*H04W 64/00* (2009.01)
*H04J 3/14* (2006.01)

(52) U.S. Cl. ..... 370/252; 370/350; 370/473; 455/456.2; 455/456.6

(58) Field of Classification Search .................. 370/252, 370/278, 328, 338, 350, 469, 473; 455/456.1, 455/456.2, 456.6
See application file for complete search history.

(56) References Cited

U.S. PATENT DOCUMENTS

| | | | |
|---|---|---|---|
| 7,120,092 B2 * | 10/2006 | del Prado Pavon et al. | .... 368/46 |
| 7,376,430 B2 * | 5/2008 | Matsuda | .............. 455/456.2 |
| 7,567,537 B1 * | 7/2009 | Gurbuz et al. | ........... 370/338 |
| 2003/0222817 A1 | 12/2003 | Gfeller et al. | |
| 2004/0258012 A1 | 12/2004 | Ishii | |
| 2005/0050219 A1 | 3/2005 | Choi et al. | |
| 2005/0135491 A1 * | 6/2005 | Santhoff et al. | ............ 375/259 |
| 2005/0141476 A1 * | 6/2005 | Choi et al. | .................. 370/348 |
| 2008/0123608 A1 * | 5/2008 | Edge et al. | .................. 370/338 |
| 2008/0231498 A1 * | 9/2008 | Menzer et al. | ............. 342/134 |
| 2009/0028077 A1 * | 1/2009 | Shepherd et al. | .......... 370/310 |

* cited by examiner

*Primary Examiner* — Chi Pham
*Assistant Examiner* — Ahmed Elallam
(74) *Attorney, Agent, or Firm* — Lee, Hong, Degerman, Kang & Waimey

(57) ABSTRACT

Provided are a management procedure in a wireless communication system and a station supporting the management procedure. In the method, a requested station receives a location request frame including a location request option sub-element which contains a value for indicating a timing measurement request from a requesting station. The requested station transmits an acknowledgement frame in response to the location request frame to the requesting station. The requested station transmits to the requesting station a location response frame including a timing measurement sub-element which contains a time difference between a transmission end time of the acknowledgement frame and a reception end time of the location request frame in response to the location request frame.

5 Claims, 9 Drawing Sheets

FIG. 7

| Element ID (251) | Length (252) | Timestamp Difference (253) | Timestamp Difference Units (254) | Time Stamp Difference Accuracy (255) | Ingress Timestamp (optional) (256) |
|---|---|---|---|---|---|
| 1 | 1 | 1 | 1 | 1 | 12 |

Octets:

MANAGEMENT PROCEDURE IN WIRELESS COMMUNICATION SYSTEM AND STATION SUPPORTING MANAGEMENT PROCEDURE

CROSS-REFERENCE TO RELATED PATENT APPLICATIONS

This application claims the benefits of Korean Patent Application No. 10-2007-0050730 filed on May 25, 2007 in the Korean Intellectual Property Office, the disclosure of which is incorporated herein in its entirety by reference.

BACKGROUND OF THE INVENTION

1. Field of the Invention

The present invention relates to a wireless communication system, and more particularly, to a management procedure in a wireless communication system associated with a location service and a station supporting the management procedure.

2. Description of the Related Art

With development of information communication technologies, a variety of wireless communication technologies have been developed. A wireless LAN (WLAN) is a technology permitting wireless access to Internet in specific service areas such as home or companies or air planes by the use of portable terminals such as a personal digital assistant (PDA), a laptop computer, and a portable multimedia player (PMP) on the basis of a radio frequency technology.

These days, thanks to the increased availability of WLANs, portable terminal users such as laptop computer users are able to perform their tasks with increased mobility. For example, a user can take his laptop computer from his desk into a conference room to attend a meeting and still have access to his local network to retrieve data and have access to the Internet via one or more modems or gateways present on the local network without being tethered by a wired connection. Similarly, business travelers commonly use their portable terminals to gain access to their email accounts, to check if there is any unread email, and to read and send email.

In the initial WLAN technology, a data rate of 1 to 2 Mbps was supported by the use of frequency hopping, spread spectrum, and infrared communication using a frequency of 2.4 GHz in accordance with the IEEE 802.11. In recent years, with the development of the wireless communication technology, 54 Mbps in maximum can be supported by applying the orthogonal frequency division multiplex (OFDM) technology, etc. to the WLAN. In addition, the IEEE 802.11 has developed or is developing wireless communication technologies for improvement in quality of service (QoS), compatibility of an access point (AP) protocol, security enhancement, wireless resource measurement, wireless access in vehicular environment, fast roaming, mesh network, interworking with external networks, wireless network management, and the like.

Among the wireless communication technologies, the wireless network management is designed to allow stations (STAs) or access points (APs) to collect information on wireless networks, to diagnose problems, or to provide protocols associated with procedures for providing services other than data transmission. For example, the wireless network management in a wireless LAN provides protocols associated with an event request and report procedure, a diagnostic request and report procedure, a location service procedure, a basic service set (BSS) transition management procedure, a flexible broadcast multicast service (FBMS) procedure, a traffic filter service (TFS) procedure, a sleep mode request and response procedure, and the like.

The location service procedure or a simple location procedure includes a protocol for the wireless network management for providing presence information or STA location information, such as accessibility, availability, and/or interactions of a portable terminal at a specific time. In general, the presence information means information on a state of a portable terminal at a specific time, means for making a communication between users, an intention for communication, capability at the time of communication. The location information includes information required for allowing a STA to find out its location, other than information directly indicating a location of a STA.

However, the discrimination of the presence information and the location information is arbitrary and the information pieces may be incorporated into any one in accordance with a network management protocol of a wireless communication system. For example, the wireless network procedure relating to a location service in a wireless LAN system includes a communication protocol for transmitting both the presence information and the location information. Accordingly, the location service procedure or the location procedure in the following description includes all the protocols for acquiring or providing radio information associated with a portable terminal or a base station, location information, and motion information.

In a wireless communication system, location information of a portable terminal which can be acquired by the use of a management procedure of a location service serves as basic information for providing the location service such as an emergency service to a user or efficiently managing a wireless communication system. The location information of a portable terminal in an environment where a global positioning system (GPS) is not installed or cannot be utilized (for example, in a building) can be acquired by the use of another terminal knowing the location. For example, when a distance to another portable terminal or a base station knowing the location can be acquired, information on the correct location of the portable terminal can be acquired using a trigonometrical survey.

A distance between two portable terminals or between a portable terminal and a base station communicating with each other can be acquired using a time until a transmission signal arrives, that is, a propagation delay time of a signal. However, since a communication is made in a relatively narrow area in a wireless LAN environment and the propagation speed of a signal is close to the light speed, it is very important to knowing accurate location information that the propagation delay time should be acquired accurately in a very minute unit such as a nano-second unit or less. In this case, a signal processing time in the portable terminal or the base station can affect acquiring the accurate propagation delay time even if it is very short, thereby greatly affecting the accuracy of the location information.

SUMMARY OF THE INVENTION

An object of the invention is to provide a management procedure of a wireless communication system associated with a location service, which can precisely reflect a signal processing time in a station such as a portable terminal or a base station so as to accurately calculate a propagation delay time.

Another object of the invention is to provide a station supporting a management procedure of a wireless communication network associated with a location service in a wireless communication system, which can precisely reflect a signal processing time in a station such as a portable terminal or a base station so as to accurately calculate a propagation delay time.

According to an aspect of the invention, there is provided a method of managing a wireless network for a location procedure, the method comprising: receiving a location request frame including a location request option sub-element which contains a value for indicating a timing measurement request; transmitting an acknowledgement frame in response to the location request frame; and transmitting a location response frame including a timing measurement sub-element which contains a time difference between a transmission end time of the acknowledgement frame and a reception end time of the location request frame in response to the location request frame.

According to another aspect of the invention, there is provided a method of managing a wireless network for a location procedure, the method comprising: transmitting a location request frame including a location request option sub-element which contains a value for indicating a timing measurement request; receiving an acknowledgement frame in response to the location request frame; and receiving a location response frame including a timing measurement sub-element which contains a time difference between a reception end time of the location request frame and a transmission end time of the acknowledgement frame in response to the location request frame.

According to another aspect of the invention, there is provided a wireless communication station in a wireless local access network, the station comprising: a processor configured to generate and process frames; and a transceiver operably connected to the processor and configured to transmit and receive the frames, wherein the transceiver is configured to: receive a location request frame including a location request option sub-element which contains a value for indicating a timing measurement request and forward the received location request frame to the processor; transmit an acknowledgement frame in response to the location request frame generated by the processor; and transmit a location response frame generated by the processor, which includes a timing measurement sub-element containing a time difference between a reception end time of the location request frame and a transmission end time of the acknowledgement frame in response to the location request frame generated by the processor.

According to another aspect of the invention, there is provided a wireless communication station in a wireless local access network, the station comprising: a processor configured to generate and process frames; and a transceiver operably connected to the processor and configured to transmit and receive the frames, wherein the transceiver is configured to: transmit a location request frame which includes a location request option sub-element and which is generated by the processor, the location options sub-element containing a value for indicating a timing measurement request; receive an acknowledgement frame in response to the location request frame and forward the acknowledgement frame to the processor; and receive a location response frame which includes a timing measurement sub-element containing a time difference between a transmission end time of the location request frame and a reception end time of the acknowledgement frame and forward the location response frame, in response to the location request frame.

BRIEF DESCRIPTION OF THE DRAWINGS

The above and other features and advantages of the present invention will become more apparent by describing in detail exemplary embodiments thereof with reference to the attached drawings in which:

FIG. 7 is a block diagram illustrating a format of a location parameter element field of the location response frame shown in FIG. 6.

DETAILED DESCRIPTION OF THE INVENTION

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. In embodiments and the drawings, respective elements are denoted by designation numerals for convenience.

In the following embodiments, a wireless LAN (WLAN) system is described as a wireless communication system, but this is only exemplary. Accordingly, the embodiments to be described below can be applied to wireless communication systems other than the WLAN system, as long as they can be permitted in nature. In this case, terms or words specific to the WLAN system used in the embodiments can be properly modified into terms or words customarily used in the corresponding wireless communication system.

Figure 1:
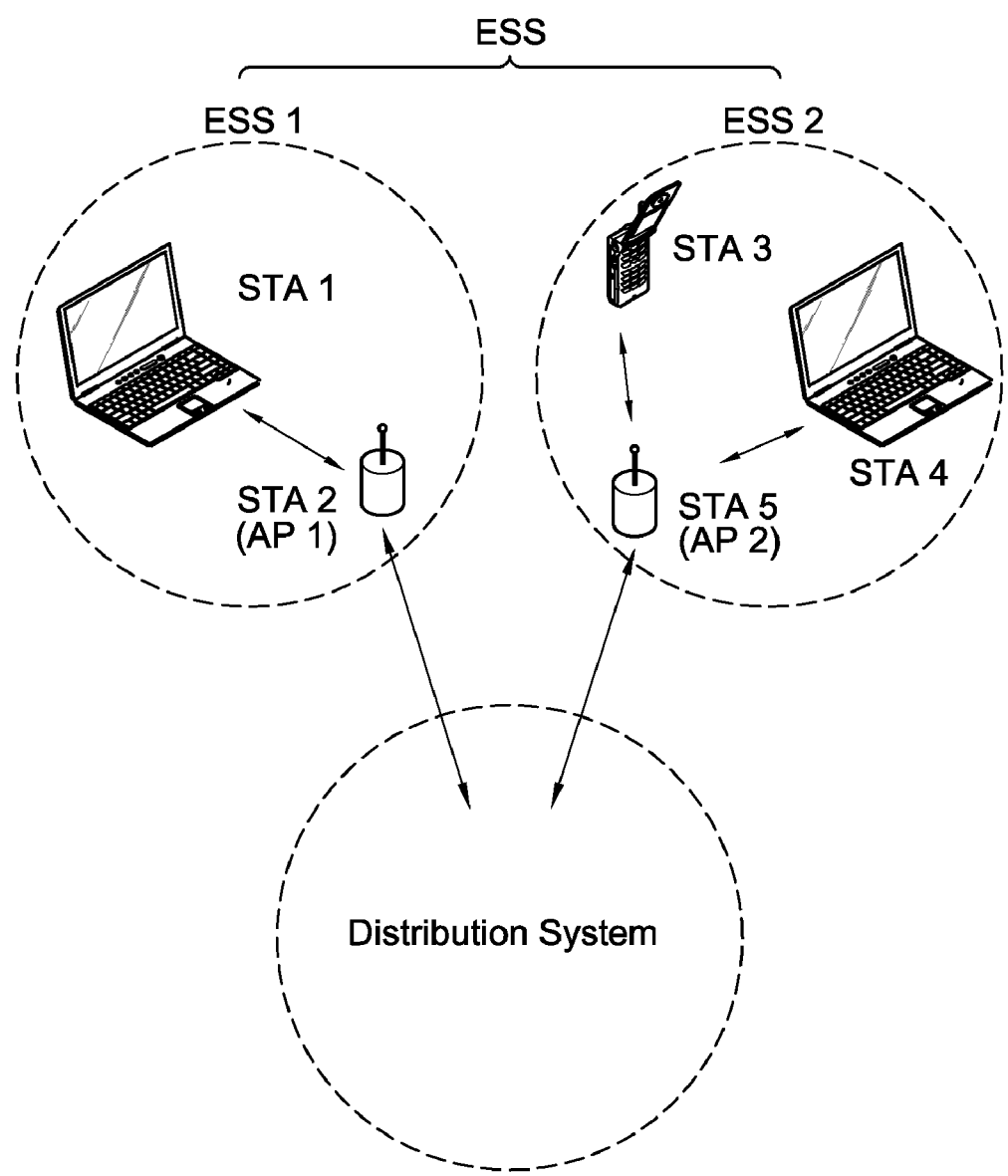
FIG. 1 is a block diagram illustrating a configuration of an infrastructure basic service set as an example of a wireless LAN system.
Figure 2:
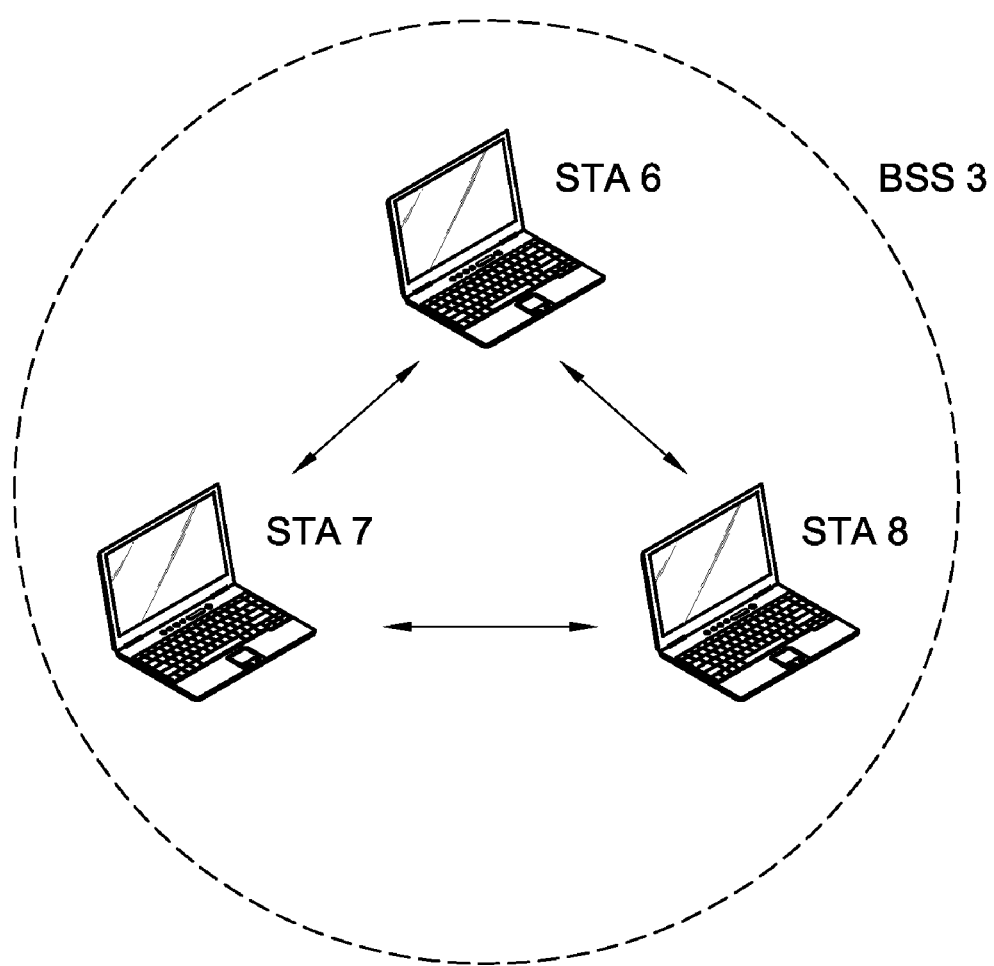
FIG. 2 is a block diagram illustrating a configuration of an independent basic service set as an example of a wireless LAN system.

FIGS. 1 and 2 schematically show configurations of examples of a WLAN system to which the embodiments of the invention can be applied.

As shown in FIGS. 1 and 2, a WLAN system includes one or more basic service sets (BSS). The BSS is a set of stations (STAs) which can be successfully synchronized and communicate with each other, but is not a concept indicating a specific area. The BSS can be classified into an infrastructure BSS and an independent BSS (IBSS). The former is shown in FIG. 1 and the latter is shown in FIG. 2. The infrastructure BSSs BSS1 and BSS2 include one or more STAs STA1, STA2, STA3, and STA4, an access point (AP) which is a STA providing a distribution service, and a distribution system (DS) connecting plural APs AP1 and AP2. On the contrary, the IBSS does not include an AP and all the STAs are mobile stations STA6, STA7, and STA8. In the IBSS, an access to the DS is not permitted, thereby constituting a self-contained network.

A STA is a functional unit including a medium access control (MAC) interface and a physical layer interface for a wireless medium in accordance with the IEEE 802.11 standard and includes both APs and non-AP stations in a wide meaning. A station for wireless communication includes a processor and a transceiver and further includes a user interface and a display unit. The processor is a functional unit designed to generate a frame to be transmitted through a wireless network or to process a frame received through the wireless network and serves to perform a variety of functions of controlling the station. The transceiver is operably connected to the processor and is a unit designed to transmit and receive frames through a wireless network.

A portable terminal operated by a user is a non-AP STA (STA1, STA3, STA4, STA6, STA7, and STA8). Simply, a STA may mean a non-AP STA. The non-AP STA may be called a wireless transmitting/receiving unit (WTRU), a user equipment (UE), a mobile station (MS), a portable terminal, or a mobile subscriber unit.

The AP (AP1 and AP2) is a functional entity providing connection to the DS through a wireless medium for the associated stations. A communication between the non-AP STAs in the infrastructure BSS including an AP is made through the AP in principle, but the non-AP STAs may communicate directly with each other when a direct link is set up therebetween. The AP may be called a convergence controller, a base station (BS), a node-B, a base transceiver system (BTS), or a site controller, in addition to the tile of an access point.

Plural infrastructure BSSs can be connected to each other through the DS. The plural BSSs connected through the DS are called an extended service set (ESS). The STAs in the ESS can communicate with each other and the non-AP STAs can move from one BSS to another BSS while communicating without any interception.

The DS is a mechanism for allowing an AP to communicate with another AP. Accordingly, the AP can transmit a frame for the STAs associated with the BSS managed by the AP, forward a frame when a STA moves to another BSS, or forward a frame to an external network such as a wired network. The DS may not be a network necessarily, and is not limited in type as long as it can provide a predetermined distribution service defined in the IEEE 802.11 standard. For example, the DS may be a wireless network such as a mesh network or a physical structure for connecting the APs to each other.

Figure 3:
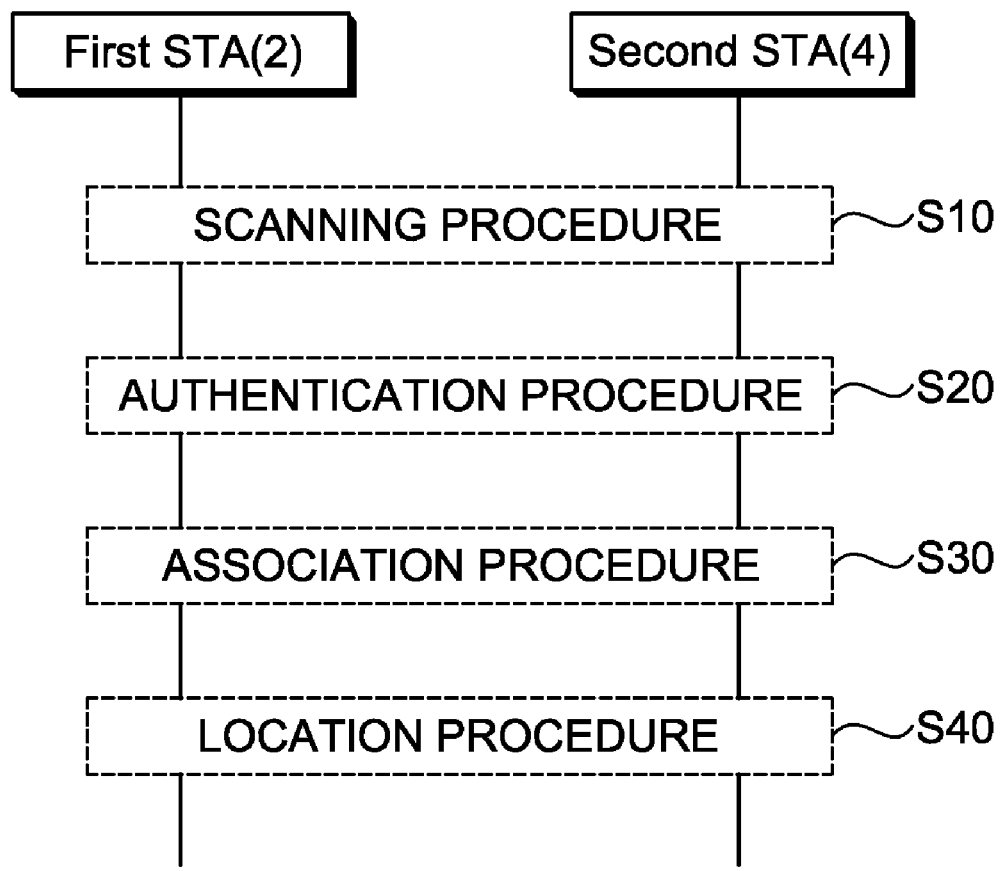
FIG. 3 is a flowchart illustrating a management procedure of a wireless network in a wireless communication system according to an embodiment of the invention.

FIG. 3 is a flowchart illustrating a management procedure of a wireless network in a wireless LAN system shown in FIG. 1 or 2 or in a wireless communication system including the wireless LAN system or equivalent thereto according to an embodiment of the invention. The flowchart of operations between the first STA 2 and the second STA 4 shown in FIG. 3 can show a procedure performed between a non-AP STA and an AP constituting an infrastructure BSS, but it is obvious to those skilled in the art that the embodiment is not limited to the procedure. For example, the embodiment can be equally or similarly applied to operations between non-AP STAs in an IBSS, operations between mesh points (MP) in a mesh network system, or operation between terminals of different wireless communication systems or between a terminal and a base station, as long as it can be applied thereto in nature.

Referring to FIG. 3, a radio measurement procedure in a wireless communication system according to the embodiment of the invention further includes as preliminary procedures a scanning procedure (S10), an authentication procedure (S20), and/or an association procedure (S30) and further includes a the location procedure S40 which is performed after the preliminary procedures S10 to S30. According to the embodiment of the invention, some procedures of the preliminary procedures may not be essential but arbitrary.

Referring to FIG. 3, the scanning procedure S10 is first performed between the first STA 2 and the second STA 4. The scanning procedure S10 is a procedure for allowing the first STA 2 to search for a candidate station to be associated in the association procedure S30, for example, a procedure for allowing a non-AP STA to search for an AP in the infrastructure BSS. However, the scanning procedure in a wider meaning may include a procedure for allowing a non-AP STA to search for a neighboring non-AP STA in the IBSS or a procedure for allowing a non-AP STA to search for a neighboring MP in a mesh network.

The scanning procedure can be classified into two types. One is a passive scanning method using a beacon frame transmitted from the second STA 4 and the like. In this method, the first STA 2 to access a wireless LAN can search for an accessible BSS by receiving a beacon frame periodically transmitted from the second STA 4 which is an AP managing the corresponding BSS (or IBSS). The passive scanning method can be applied when the second STA 4 is an AP transmitting a beacon frame.

The other is an active scanning method. In this method, the first STA 2 to access a wireless LAN system, for example, an AP, first transmits a probe request frame. The second STA 4 having received the probe request frame transmits a probe response frame including a service set ID (SSID) of the BSS managed by the AP and information on capability supported by the AP. Accordingly, the first STA 2 can know existence of a candidate AP and a variety of information on the candidate AP from the received probe response frame.

In the scanning procedure S10, when the second STA 4 transmitting the beacon frame or the probe response frame is a device supporting a location service, the beacon frame or the probe response frame may include location parameter information elements. The location parameter information can include one or more of various information pieces required for allowing the first STA 2 having received the beacon frame, etc. to perform the location procedure, such as location indication parameters, location indication channels, location request options, location service parameters, and radio information pieces.

Referring to FIG. 3, the authentication procedure S20 is performed between the first STA 2 and the second STA 4. The authentication procedure S20 is a procedure for negotiating an authentication process and an encoding method between entities participating in a wireless communication. For example, the first STA 2 can perform the authentication procedure S20 with the second STA 4 to be associated of one or more APs searched for in the scanning procedure S10, for example, an AP. In the WLAN, since an open system authentication method is used in most cases, the second STA 4 as an AP performs the authentication process without any condition in response to the authentication request from the first STA 2. Reinforced authentication methods include EAP-TLS (Extensible Authentication Protocol-Transport Layer Security), EAP-TTLS (Extensible Authentication Protocol-Tunneled Transport Layer Security), EAP-FAST (Extensible Authentication Protocol-Flexible Authentication via Secure Tunneling), and PEAP (Protected Extensible Authentication Protocol) based on the IEEE 802.1x standard.

When the authentication process is successfully completed in the authentication procedure S20, the first STA 2 performs the association procedure S30. The association procedure S30 may be an arbitrary procedure which is performed when the first STA 2 is a non-AP STA and the second STA 4 is an AP. The association procedure S30 is to set up an identifiable link, that is, a wireless link, between the first STA 2 and the second STA 4. In the association procedure S30, the first STA 2 transmits an association request frame to the second STA 4 having successfully completed the authentication procedure S20 and the second STA 4 transmits to the first STA 2 an association response frame having a state value of "successful" in response to the association request frame. The association response frame includes an identifier for identifying the association with the first STA 2, for example, an association ID (AID).

When the association procedure S30 has been successfully completed but the connection state between the first STA 2 and the second STA 4 is deteriorated due to a variable channel condition, the first STA 2 can perform the association procedure with another accessible AP again, which is called a re-association procedure. The re-association procedure is very similar to the above-mentioned association procedure S30. More specifically, in the re-association procedure, the first STA 2 transmits a re-association request frame to a different AP (an AP having successfully completed the authentication procedure S20 among the candidate APs searched for in the scanning procedure S10) other than the AP currently associated therewith, and the different AP transmits a re-association response frame to the first STA 2. However, the re-association request frame further includes information on the AP previously associated therewith and the re-associated AP can transmit data buffered in the second STA 4, which is an existing AP, using the information.

According to the embodiment, in the association procedure S30 or the re-association procedure, the association request frame or the re-association frame transmitted from the first STA 2 to the second STA 4 may include a location capability value of the first STA 2. Accordingly, the first STA 2 supporting the location capability can transmit the association request frame or the re-association request frame in which a location descriptor sub-element is included in a location parameter information element.

Referring to FIG. 3, the location procedure S40 is performed between the first STA 2 and the second STA 4 having completed the authentication procedure S20 or completed the association procedure S30 in addition thereto. Although it is shown in FIG. 3 that the location procedure is performed between the first STA 2 and the second STA 4 having completed the association procedure S30 in the infrastructure BSS, the location procedure S40 according to an embodiment of the invention described later is not limited thereto. That is, the location procedure according to the embodiment of the invention can be applied between two STAs setting up a wireless link therebetween, regardless of a non-AP STA, an AP, or an MP. For example, the location procedure according to the embodiment of the invention may be performed between the non-AP STA and the AP shown in FIG. 3, between two peer non-AP STAs setting up a direct link therebetween, or between two peer MPs setting up a mesh link therebetween.

The location procedure in a wireless LAN can be performed for various purposes. For example, the location procedure can be performed between the STAs for the purpose that a STA periodically provides location information another STA, that a STA requests its own location information to a peer STA supporting a location service and being capable of providing a location of another STA, that a STA requests location information of a peer STA to the peer STA supporting a location service and being capable of providing its own location, or that a STA supporting location capability provides data for knowing its own location. Alternatively, the location procedure may be performed for the purpose that a STA provides location parameters to another STA in response to a request or for the purpose of interchanging a frame for calculating a location.

In order to start the location procedure, the first STA 2 first transmits a request message to the second STA 4. The request message may be a presence request frame or a location request frame. Here, the title is not particularly limited. The request message may include predetermined information suitable for the purpose of performing the location procedure. For example, when a STA starts a location procedure to provide location information, the STA may transmit a location request frame including location information to be provided in a unicast or broadcast manner. Alternatively, when the STA requests for its remote location information, the STA may transmit a location request frame including location parameter information elements containing location descriptor sub-elements.

The second STA 4 having received the request message, for example, an AP, can transmit a response message to the first STA 2. When the request message is the presence request frame or the location request frame, the response message may be a presence response message or a location response message. The second STA 4 can arbitrarily transmit the response message. Accordingly, only when information requesting for a response is contained in the received request message, the second STA 4 can transmit the response message.

Figure 4:
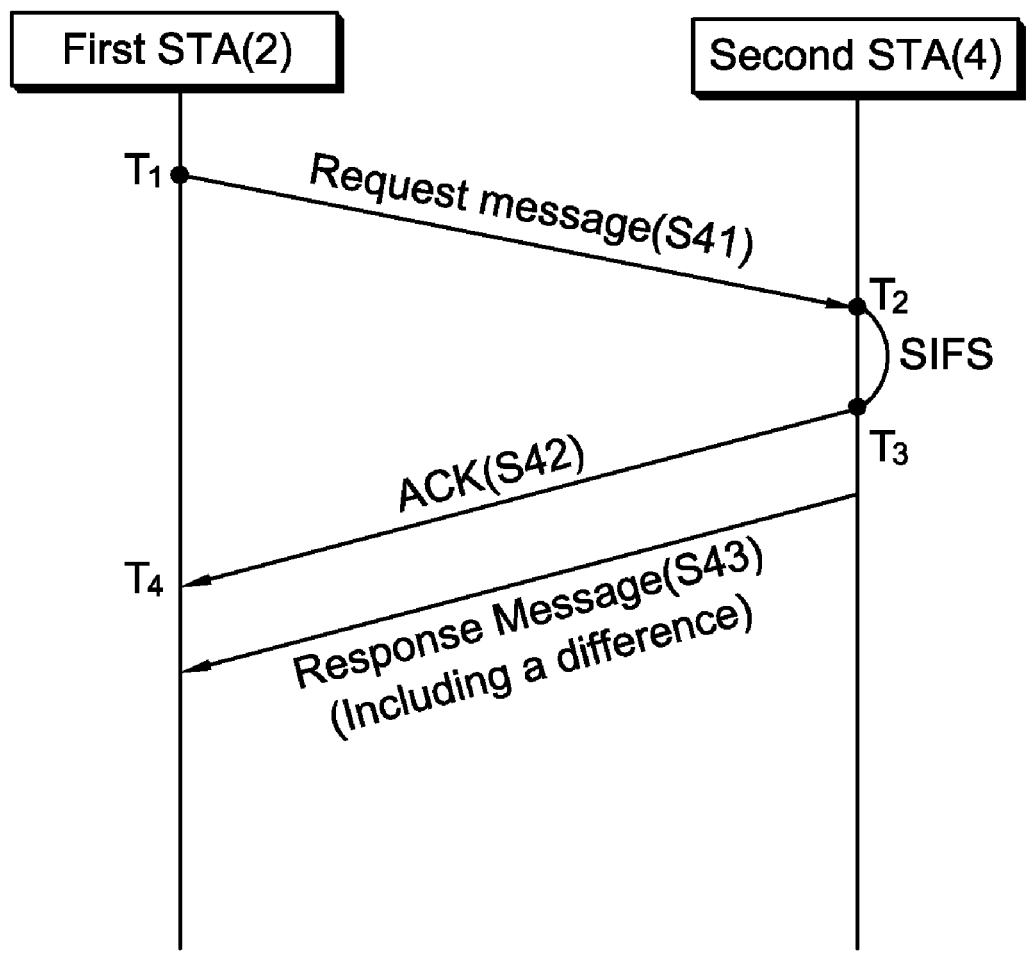
FIG. 4 is a message flowchart illustrating a procedure of allowing a requesting station to acquire timing measurement information from a requested station as an example of a location procedure (S40) shown in FIG. 3.

FIG. 4 is a message flowchart illustrating a procedure of allowing the first STA 2 to acquire timing measurement information from the second STA 4, which is an example of the location procedure S40 shown in FIG. 3. The first STA 2 shown in FIG. 4 is a device requiring the timing measurement information and supporting location capability. The first STA 2 may be a portable device, but is not limited to it. The second STA 4 is a device supporting location capability or a location service and an ingress time stamping. The second STA 4 may be a fixed device (for example, AP), but is not limited to it. For example, the second STA 4 may be a device having mobility, such as a non-AP STA setting up a direct link with the first STA 2.

When the second STA 4 supports the location service but does not support the ingress time stamping, the first STA 2 cannot acquire the timing measurement information from the second STA 4. For example, the second STA 4 supporting the location service but not supporting the ingress time stamping receives a location request frame including a location request option sub-element containing information for requesting for the timing measurement, the second STA 4 transmits a location response frame including a location state sub-element of "impossible" or "incapable" to the first STA 2 as a requesting STA.

Now, a management procedure of a wireless network associated with a location service according to an embodiment of the invention will be described with reference to FIG. 4.

Referring to FIG. 4, first, the first STA 2 transmits a request message for requesting for timing measurement information to the second STA 4 (S41). The request message may be a location request frame or a presence request frame, but is not limited to them. Referring to FIG. 4, since the request message is transmitted from the first STA 2 at time $T_1$ and is received by the second STA 4 at time $T_2$ in a predetermined propagation delay time, the propagation delay of the request message indicates a difference between the time ($T_1$) when the second STA 4 receives the request message and the time ($T_2$) when the first STA 2 transmits the request message, that is, a time ($T_2$-$T_1$). However, the specification of the reception time ($T_2$) is important for accurately calculating a location, which will be described later.

Figure 5:
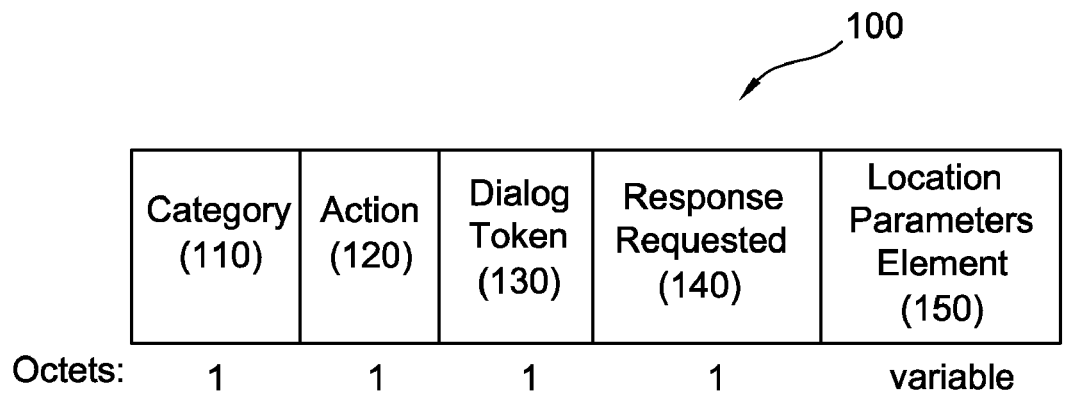
FIG. 5 is a block diagram illustrating a format of a location request frame.

FIG. 5 shows a format of the location request frame as an example of the request message. Referring to FIG. 5, the location request frame 100 includes a category field 110, an action field 120, a dialog token field 130, a response requested field 140, and a location parameter element field 150.

A value indicating a wireless network management category may be set in the category filed 110 of the location request frame 100. A vale indicating that the frame 100 is a location request frame among plural management frames usable in the wireless network management can be set in the action field 120. A value not zero and used to identify the exchange of the location request frame and the location response frame transmitted in response to the location request frame is included in the dialog token field 130. This is a value proper to the location request frame transmitted to a given target MAC address.

The response requested field 140 is a unit for displaying an intention of a transmitting STA, that is, the first STA 2, regarding whether the STA having received the location request frame 100, for example, the second STA 4, should transmit a response message. For example, when the response requested field 140 is set to "1", it indicates that the first STA 2 requests the STA having received the location request frame 100 for a response message. When the response requested field 140 is set to "0", it indicates that the first STA 4 does not request for the response message. Like this embodiment, when the location request message 100 is transmitted to request for timing measurement information, the response requested field 140 is set to "1".

The location parameter element field 150 includes one or more sub-fields including location parameter information elements used for the location service. In case of the location request frame, the sub-fields can include one or more sub-fields of, for example, a radio information sub-field, a motion sub-field, a location descriptor sub-field, a location data sub-field, a location request option sub-field, and a vendor specific information sub-field.

The location request option sub-field 150 may be a bit field for specifying information elements desired to be included in the response message in response to the location request frame, for example, the location response frame. Accordingly, the location request frame 100 transmitted from the first STA 2 intending to acquire the timing measurement information can include the location request option sub-field 150 in which a predetermined value (for example, "1") is set in a bit indicating the timing measurement sub-element.

The second STA 4 having received the request message requesting for the timing measurement information transmits an acknowledgement message to the first STA 2 (S42). When the request message is the location request message, the acknowledgement message may be an ACK frame, but is not limited to it. The ACK frame is transmitted at time $T_3$ with a predetermined inter-frame space from time $T_2$ when the request message is received in accordance with a message processing rule of the corresponding protocol. For example, the predetermined inter-frame space may be a short inter-frame space (SIFS).

In this step, the acknowledgement message is transmitted from the second STA 4 at time $T_3$ and is received by the first STA 2 at time $T_4$ in a predetermined propagation delay time. Accordingly, the propagation delay time of the acknowledgement indicates a difference between the reception time $T_4$ of the first STA 2 and the transmission time $T_3$ of the second STA 4, that is, time $T_4$-$T_3$. Since time $T_4$-$T_3$ and time $T_2$-$T_1$ can vary depending on the channel condition, they are not necessarily equal to each other. However, it is assumed that the times are equal to each other so as to calculate a location using the acquired timing measurement information. Here, it is important to accurately calculating the location when the transmission time $T_3$ is specified, which is described later.

The second STA 4 having transmitted the acknowledgement message transmits a response message including the timing measurement information to the second STA 2 (S43). The response message is transmitted in response to the request message received in step S41. When the request message is the location request frame, the response message may be the location response frame.

Figure 6:
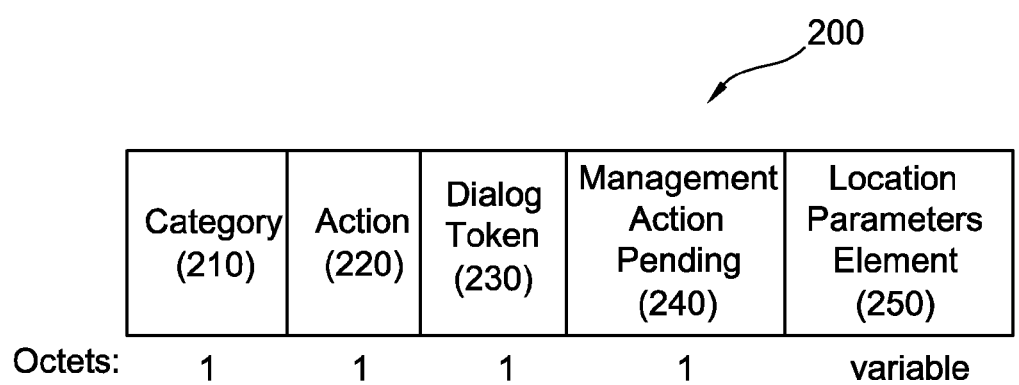
FIG. 6 is a block diagram illustrating a format of a location response frame.

FIG. 6 shows an example of a format of the location response frame as an example of the response message. Referring to FIG. 6, the location response frame 200 includes a category field 210, an action field, 220, a dialog token field 230, a management action pending field 240, and a location parameter element field 250.

A value indicating a management category of a wireless network can be set in the category field 210 of the location response frame 200. A value indicating that the frame 200 is associated with a location response can be set in the action field 220. A value not being zero and included in the received location request frame can be set in the dialog token field 230. A value indicating whether a pending management action exists for a destination STA of the frame 200 can be included in the management action pending field 240.

The location parameter element field 250 includes one or more sub-fields containing location parameter information elements. The location parameter element field 250 may further include other sub-fields other than the timing measurement sub-field shown in FIG. 7. For example, the location parameter element field 250 may further include a radio information sub-field, a motion sub-field, a location descriptor sub-field, a location data sub-field, and/or a vendor specific information sub-field.

The location parameter element field 250 may further include a location status sub-field for providing the result of the location request and/or a location source identifier sub-field for providing a location source identifier. When the requested STA can response to include information on the request specified in the received location request frame, a value indicating "successful" may be set in the location status sub-field. On the contrary, when the requested STA does not have the capability for performing the request specified in the location request frame, a value indicating "incapable" may be set in the location status sub-field.

According to the embodiment of the invention, the location parameter element field 250 includes a timing measurement sub-field into which a time stamp difference as the timing measurement information requested for by the first STA 2 is inserted. The time stamp difference is an internal processing time until the acknowledgement message is transmitted in step S42 after the request message is received by the second STA 4 in step S41. Referring to FIG. 4, the value inserted into the time stamp difference is approximately the time $T_3$-$T_2$. However, since the time stamp difference should be measured precisely to accurately calculate the location using the propagation delay time, the value inserted into the timing measurement sub-field can vary how to define the time $T_2$ as the reception time of the request message and the transmission time $T_3$ of the acknowledgement message. Details of the time stamp difference will be described later.

FIG. 7 is a block diagram illustrating a configuration of the timing measurement sub-field according to an embodiment of the invention. Referring to FIG. 7, the timing measurement sub-field includes an element ID portion 251, a length portion 252, a time stamp difference portion 253, a time stamp difference unit portion 254, and a time stamp difference accuracy portion 255. The timing measurement sub-field may further include an ingress time stamp portion 256.

The element ID portion 251 includes information indicating that the corresponding sub-field is the timing measurement sub-field. The length portion 252 includes a value indicating a length of the timing measurement sub-field 250. For example, the value of the length portion 252 can indicate a 6 or 18 octet. The time stamp difference portion 253 includes a difference the time $T_2$ when the request frame is received from the first STA 2 and the time $T_3$ when the acknowledgement frame is transmitted in response to the request frame, that is, the value of time $T_3$-$T_2$. The time stamp difference unit portion 254 includes information indicating a unit of the value included in the time stamp difference 253. The time stamp difference accuracy portion 255 includes an expected standard deviation of the time stamp difference of the time stamp difference portion 253. The ingress time stamp portion 256 includes information indicating the time information when the request frame is received by the second STA 4, that is, time $T_2$.

In accordance with the location procedure according to the embodiment of the invention described above, the first STA 2 having received the response message including the time stamp difference as the timing measurement information can calculate its location using the timing measurement information. For this purpose, since the first STA 2 knows the time $T_1$ when it transmits the request message in step S41 and the time $T_4$ when it receives the response message in step S43 and the time stamp difference, that is, the time $T_3$-$T_2$, is included in the received response message, the first STA 2 calculates the propagation delay generated between the first STA 2 and the second STA 4 by the use of Expression 1. The distance between the first STA 2 and the second STA 4 can be obtained by multiplying the propagation delay calculated using Expression 1 by the speed of light as the propagation speed.

$$\text{Propagation Delay} = ((T_4-T_1)-(T_3-T_2))/2 \qquad <\text{Expression 1}>$$

In this way, the first STA 2 can acquire the timing measurement information in the location procedure shown in FIG. 4 and calculate the distance to the second STA 4 using the acquired timing measurement information. The first STA 2 can acquire its location information using the distance information calculated by repeatedly performing the same procedure on plural (for example, 3 or more) different STAs.

In a wireless environment, it is assumed that a signal is transmitted at the speed of light. Accordingly, when the propagation delay is not accurately calculated, the location information may be greatly incorrect. In the above-mentioned embodiment, the calculated propagation delay can vary depending on what criterion is used to measure $T_1$, $T_2$, $T_3$, and/or $T_4$, and how to define the value of the time stamp difference $T_3$-$T_2$ transmitted from the second STA 4 to the first STA 2 can greatly affect the accuracy of the location information.

The times $T_2$ and $T_3$ causing the time stamp difference $T_3$-$T_2$ are specifically described with reference to the transmission timing (or transmission PLCP (Physical Layer Convergence Procedure)) and the reception timing (or reception PLCP) in a modulation system used in a wireless LAN, such as the DSSS system for a 2.4 GHz band. It will be obvious to those skilled in the art that the following description can be similarly applied to another modulation system in a wireless LAN other than the DSSS system, such as a frequency hopping spread spectrum (FHSS) system or an orthogonal frequency division multiplexing (OFDM) system for a 2.4 GHz band.

Figure 8:
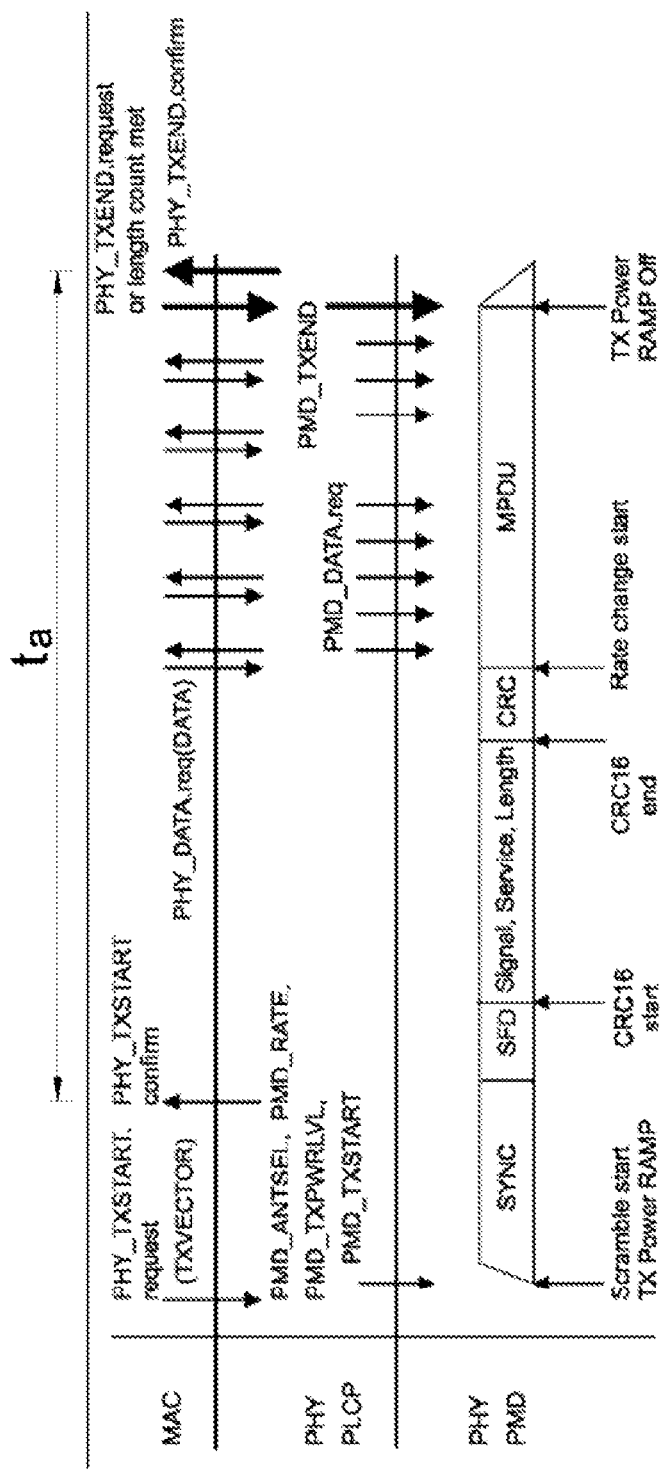
FIG. 8 is a diagram illustrating a transmission physical layer convergence procedure (transmission PLCP) in a direct sequence spread spectrum (DSSS) system for a 2.4 GHz band.
Figure 9:
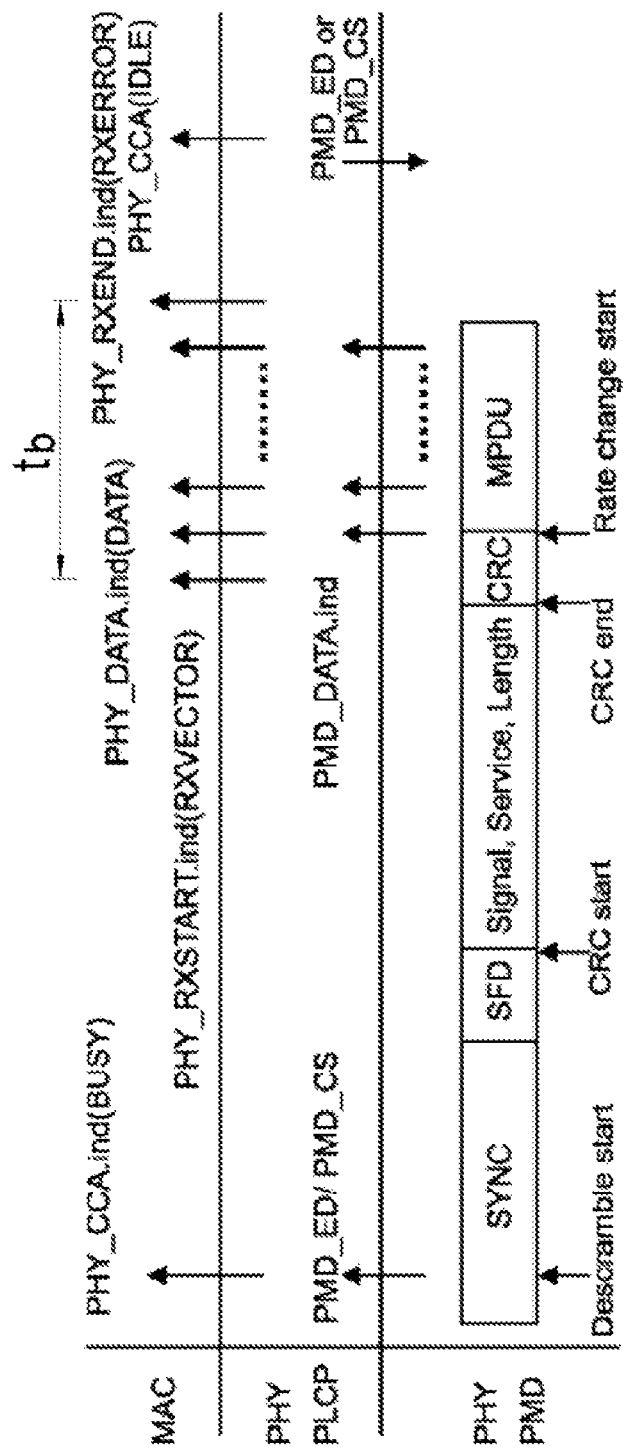
FIG. 9 is a diagram illustrating a reception PLCP in the DSSS system for the 2.4 GHz band.

FIGS. 8 and 9 show the transmission PLCP and the reception PLCP in the DSSS system for a 2.4 GHz band, respectively. Referring to FIG. 8, the transmission PLCP is started by generating a transmission start request signal (PHY-TX-START.request) in a MAC sub-layer and forwarding the generated transmission start request signal to a physical layer (PHY) and is ended by generating a transmission end confirmation signal (PHY-TXEND.confirm) in the physical layer and forwarding the generated transmission end confirmation signal to the MAC sub-layer. Referring to FIG. 9, in the reception PLCP, when the physical layer entity is in a reception state and a predetermined requirement (whether the received signal can be completely recognized and is in a supportable format) is satisfied, the physical layer generates a reception start indication signal (PHY-RXSTART.indication) and forwards the generated reception start indication signal. When the reception is ended without any error, the physical layer generates a reception end indication signal (PHY-RXEND.indication) and forwards the generated reception end indication signal to the MAC sub-layer.

In this way, referring to the transmission PLCP and the reception PLCP, when a frame is transmitted or received, a slight difference exists between the time when the transmission or reception is started (for example, the time when the transmission start request signal or the reception start indication signal is generated) and the time when the transmission or reception is ended (for example, the time when the transmission end confirmation signal or the reception end indication signal is generated). For example, referring to FIG. 8, between the time when the MAC sub-layer generates the signal PHY_TXSTART.request and forwards the generated signal to the physical layer and the time when the physical layer generates the signal PHY_TXEND.confirm and forwards the generated signal to the MAC sub-layer or the MAC entity, plural times of signaling is performed between the MAC sub-layer and the physical layer and in the physical layer (more specifically, between the PHY PLCP and the PHY PMD (Physical Medium Dependent)). As a result, it can be seen that a predetermined difference $t_a$ exists between the time when the signal PHY_TXSTART.confirm is generated and the time when the signal PHY_TXEND.confirm is generated. Here, the time when the signal PHY_TXEND.confirm is generated is the transmission end time which is defined to occur at the PHY-TXEND.confirm of the transmitted acknowledgement frame.

Here, the signal PHY_TXSTART.confirm is a signal generated to confirm the start of transmission from the physical layer to the local MAC entity. The signal PHY_TXSTART.confirm is generated in response to the signal PHY_TX-START.request transmitted from the local MAC entity to the physical layer. When the MAC entity receives the signal PHY_TXSTART.confirm, the MAC entity starts the transmission of data or frames.

The signal PHY_TXEND.confirm is a signal generated to confirm the end of the transmission from the physical layer to the local MAC entity. The signal PHY_TXEND.confirm is generated in response to the signal PHY_TXEND.reqeust transmitted from the local MAC entity to the physical layer. When the MAC entity receives the signal PHY_TXEND.confirm, the MAC entity provides a time reference from a competition back-off protocol.

Referring to FIG. 9, when receiving a frame, the physical layer starts descrambling the received frame. Thereafter, between the time when the physical layer generates the signal PHY_RXSTART.indication and forwards the generated signal to the MAC sub-layer and the time when the physical layer generates the signal PHY_RXEND.indication and forwards the generated signal to the MAC sub-layer, plural times of signaling is performed between the MAC sub-layer and the physical layer and in the physical layer (more specifically, between the PHY PLCP and the PHY PMD). As a result, it can be seen that a predetermined difference $t_b$ exists between the time when the signal PHY_RXSTART.indication is generated and the time when the signal PHY_RXEND.indication is generated. Here the time when the signal PHY_RXEND.indication is generated is the reception end time which is defined to occur at the PHY-RXEND.indication of the received location request.

Here, the signal PHY_RXSTART.indication is used to allow the physical layer to notify to the local MAC entity that the PLCP receives an effective start frame delimiter (SFD) and a PLCP header. The signal PHY_RXEND.indication is used to allow the physical layer to notify to the local MAC entity that the MPDU (MAC Protocol Data Unit) currently received is ended. When receiving this signal the MAC entity starts processing the inter-frame space.

As described above, a difference occurs between the start time of the transmission or reception and the end time thereof. Accordingly, in the location procedure according to the embodiment of the invention, the criterion for measuring the times used to calculate the time stamp difference included in the response message as the requested timing measurement information, that is, the times $T_2$ and $T_3$, is clearly and precisely defined. By using the time stamp difference calculated using the times clearly and precisely defined, that is, the timing measurement information, it is possible to calculate the more accurate propagation delay and thus to improve the accuracy of the location calculation using the timing measurement information.

According to the embodiment of the invention, the time stamp difference value is defined as a difference between the time when the reception of the request message requesting for the timing measurement information is ended and the time when the transmission of the acknowledgement message in response to the received request message is ended. For example, in the flowchart shown in FIG. 4, the reception end time $T_2$ of the location request frame in step S41 is the time when the signal PHY_RXEND.indication is generated in the reception PLCP shown in FIG. 9 and the transmission end time $T_3$ of the acknowledgement frame in step S42 is the time when the signal PHY_TXEND.confirm is generated in the transmission PLCP shown in FIG. 8.

The more accurate definition of the times $T_1$, $T_2$, $T_3$, and $T_4$ as the message transmission or reception times and the criterion for calculating the time stamp difference as the timing measurement information using the times are incidentally described with reference to FIGS. 4, 8, and 9.

First, the time $T_1$ when the first STA 2 transmits the request message such as the location request frame is defined as the time when the signal PHY_TXEND.confirm in response to the location request frame is generated in the transmission PLCP of the first STA 2. The time $T_2$ when the second STA 4 receives the location request frame is defined as the time when the signal PHY_RXEND.indication in response to the received location request frame is generated in the reception PLCP of the second STA 4. The time $T_3$ when the second STA 4 transmits the acknowledgement message such as the ACK frame is defined as the time when the signal PHY_TXEND.confirm in response to the ACK frame is generated in the transmission PLCP of the second STA 4. The time $T_4$ when the first STA 1 receives the ACK frame is defined as the time when the signal PHY_RXEND.indication in response to the received ACK frame is generated in the reception PCLP of the first STA 2. The time stamp difference included in the response message such as the location response frame is defined as a difference between the time when the signal PHY_TXEND.confirm in response to the ACK frame is generated in the transmission PLCP of the second STA 2 and the time when the signal PHY_RXEND.indication in response to the location request frame is generated in the reception PLCP of the second STA 4.

The embodiments described above in detail are only examples explaining the technical spirit of the invention and it should be understood that the technical spirit is not limited to the embodiments. The scope of the invention is defined by the appended claims.

In order to acquire a propagation delay time of a signal between two stations and to calculate a distance between two stations using the acquired propagation delay time, the propagation delay time should be very accurately measured. Like the aspects of the invention, in the method of acquiring the propagation delay time using a signal processing time (that is, a difference between the reception time of a location request frame and the transmission time of a reception acknowledgement frame) in a requested station, the accurate signal processing time permits the accurate propagation delay time.

Accordingly, in the aspects of the invention, a location response frame including a time difference between the reception end time of the location request frame and the transmission end time of the reception acknowledgement frame is transmitted. Even if it is very small, a difference exists between a transmission/reception start time of a frame and a transmission/reception end time of the frame in a station. Accordingly, the time difference calculated in the aspects of the invention is accurately equal to the time required for processing a signal in the requested station.

Therefore, according to the aspects of the invention, it is possible to acquire an accurate propagation delay time of a signal in a wireless communication environment. The accurate propagation delay time permits providing of accurate location information. Since the accurate location information serves as basic information for providing a location service or an emergency service, it is possible to efficiently provide the presence service or the location service on the basis of the accurate location information, according to the aspects of the invention.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of managing a wireless network for a location procedure, the method comprising:
   receiving a location request frame including a location request option sub-element which contains a value for indicating a timing measurement request;
   transmitting an acknowledgement frame in response to the location request frame; and
   transmitting a location response frame including a timing measurement sub-element, the timing measurement sub-element comprising:
   a timestamp difference field containing a time difference between a reception end time of the location request frame and a transmission end time of the acknowledgement frame in response to the location request frame, a timestamp difference units field containing units for the timestamp difference field, and a timestamp difference accuracy field containing an expected standard deviation of the timestamp difference in the units of the timestamp difference units field, wherein the location request frame includes a location parameters element including the location request options sub-element, and wherein the location request options sub-element is a bit-field used to identify a desired location parameters sub-element to be included in the location response frame.

2. The method according to claim 1, wherein the reception end time is defined at a PHY-RXEND.indication of the received location request frame and the transmission end time is defined to occur at a PHY-TXEND.confirm of the transmitted acknowledgement frame.

3. The method according to claim 2, wherein the transmission end time is defined as the time when a physical layer issues a first signal to confirm the completion of the transmission of the acknowledgement frame to a local MAC entity, and the reception end time is defined as the time when the physical layer issues a second signal to indicate the completion of the reception of the location request frame to the local MAC entity.

4. The method according to claim 1, wherein the acknowledgement message is transmitted after a short inter-frame spacing from the reception of the location request frame.

5. The method according to claim 1, wherein a station transmitting the location response frame supports locations service and ingress timestamping, and the location response frame further includes a location status sub-element that indicates 'successful'.

* * * * *